United States Patent
Nakamura

(10) Patent No.: US 10,726,799 B2
(45) Date of Patent: Jul. 28, 2020

(54) WEARABLE DEVICE AND CONTROL METHOD

(71) Applicant: SEIKO EPSON CORPORATION, Tokyo (JP)

(72) Inventor: Hidenori Nakamura, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 232 days.

(21) Appl. No.: 16/013,113

(22) Filed: Jun. 20, 2018

(65) Prior Publication Data

US 2018/0374429 A1 Dec. 27, 2018

(30) Foreign Application Priority Data

Jun. 21, 2017 (JP) .................. 2017-121028

(51) Int. Cl.
| | | |
|---|---|---|
| G09G 3/34 | (2006.01) | |
| G06F 3/01 | (2006.01) | |
| G06F 1/16 | (2006.01) | |
| A63B 24/00 | (2006.01) | |
| G04F 7/08 | (2006.01) | |
| G06F 3/0484 | (2013.01) | |
| G06F 1/3231 | (2019.01) | |
| G06F 1/3234 | (2019.01) | |

(52) U.S. Cl.
CPC ......... *G09G 3/344* (2013.01); *A63B 24/0062* (2013.01); *G04F 7/088* (2013.01); *G04F 7/0866* (2013.01); *G06F 1/163* (2013.01); *G06F 1/3231* (2013.01); *G06F 1/3265* (2013.01); *G06F 3/011* (2013.01); *G06F 3/013* (2013.01); *G06F 3/017* (2013.01); *G06F 3/0484* (2013.01); *G09G 3/3406* (2013.01); *A63B 2024/0071* (2013.01); *G09G 2310/04* (2013.01); *G09G 2320/043* (2013.01); *G09G 2330/022* (2013.01); *G09G 2354/00* (2013.01)

(58) Field of Classification Search
CPC ........................... A63B 24/0059–0087; A63B 2024/0065–0096; G06F 3/011–017; G09G 3/3433–3446
See application file for complete search history.

(56) References Cited

U.S. PATENT DOCUMENTS

| | | | | |
|---|---|---|---|---|
| 6,621,766 B2 * | 9/2003 | Brewer | ................ | G02B 26/026 368/10 |
| 6,657,612 B2 | 12/2003 | Machida et al. | | |
| 9,990,063 B1 * | 6/2018 | Beguin | ................ | G09G 3/2044 |
| 10,146,261 B2 * | 12/2018 | Hashimoto | ............. | G02F 1/167 |

(Continued)

FOREIGN PATENT DOCUMENTS

| | | | |
|---|---|---|---|
| JP | 2002-099003 A | 4/2002 | |
| JP | 2005-017021 A | 1/2005 | |
| JP | 2015-018060 A | 1/2015 | |

*Primary Examiner* — Patrick F Marinelli
(74) *Attorney, Agent, or Firm* — Oliff PLC

(57) ABSTRACT

A wearable device includes an electrophoretic panel and a processing circuit that performs a display process of the electrophoretic panel. The processing circuit performs a second display process different from a first display process performed in a first state when an activity state of a user is determined to transition from the first state to a second state different from the first state.

12 Claims, 9 Drawing Sheets

FIRST STATE                SECOND STATE

(56) References Cited

U.S. PATENT DOCUMENTS

| | | | | |
|---|---|---|---|---|
| 2003/0026171 A1* | 2/2003 | Brewer | G02B 26/026 | 368/82 |
| 2010/0194789 A1* | 8/2010 | Lin | G09G 3/344 | 345/690 |
| 2015/0003210 A1* | 1/2015 | Joung | G04G 17/00 | 368/10 |
| 2015/0054816 A1* | 2/2015 | Yamada | G09G 3/344 | 345/212 |
| 2015/0206332 A1* | 7/2015 | Matsui | G09G 3/3446 | 345/641 |
| 2016/0107065 A1* | 4/2016 | Brammer | A63B 24/0087 | 482/8 |
| 2017/0213498 A1* | 7/2017 | Basargin | G04G 9/0064 | |
| 2017/0232294 A1* | 8/2017 | Kruger | G09B 5/02 | 434/247 |
| 2018/0039303 A1* | 2/2018 | Hashimoto | G02F 1/167 | |
| 2018/0061098 A1* | 3/2018 | Kim | G06T 11/206 | |
| 2018/0078204 A1* | 3/2018 | Surbur | A61B 5/681 | |
| 2018/0259913 A1* | 9/2018 | Brown | G04F 10/00 | |
| 2018/0374429 A1* | 12/2018 | Nakamura | G04F 7/0866 | |
| 2019/0005922 A1* | 1/2019 | Liu | G09G 5/14 | |
| 2019/0018445 A1* | 1/2019 | Watanabe | G06F 1/163 | |

\* cited by examiner

FIRST STATE: NON-SIGHT STATE

SECOND STATE: SIGHT STATE

FIRST STATE (THIRD STATE): DAILY LIFE STATE

SECOND STATE (FOURTH STATE): EXERCISE STATE

FIRST STATE

SECOND STATE

FIRST STATE                    SECOND STATE

WEARABLE DEVICE AND CONTROL METHOD

CROSS-REFERENCE TO RELATED APPLICATION

This application claims priority of Japanese Patent Application No. 2017-121028, filed Jun. 21, 2017, which is expressly incorporated herein by reference thereto in its entirety.

BACKGROUND

1. Technical Field

The present invention relates to a wearable device and a control method.

2. Related Art

Wearable devices that are worn on the bodies of users and suggest, for example, information generated inside the devices or information detected by sensors to users are known. As an example of a wearable device, for example, JP-A-2005-17021 discloses a digital display type wristwatch. As wearable devices, for example, there are wearable health devices (biological information detection devices) such as a pulsimeter, a pedometer, and an activity meter.

Electrophoretic panels are known as kinds of display panels so-called electronic paper. For example, JP-A-2002-99003 discloses an electrophoretic panel in which unit cells are disposed between a pair of substrates disposed to face each other and particle groups having different dispersion media and colors (for example, white and black) and charging characteristics (positive and negative) are contained in the unit cells. Alternatively, JP-A-2015-18060 discloses an electrophoretic panel in which a plurality of cells partitioned by partition walls are disposed between first and second substrates disposed to face each other and particle groups having different dispersion media and colors (for example, white and black) and charging characteristics (positive and negative) are contained in the unit cells.

When electrophoretic panels are used in the above-described wearable devices, the electrophoretic panel has characteristics in which deterioration progresses in accordance with the number of rewrites. Therefore, there is a concern of the deterioration progressing irregularly in a screen of an electrophoretic panel. For example, since an update frequency of a second is higher than that of an hour or a minute in time display, a display region of a second deteriorates more rapidly than other display regions. Thus, there is a concern of deterioration in the display region of a second being conspicuous (for example, the display region of a second is seen to be gray).

SUMMARY

An advantage of some aspects of the invention is to provide a wearable device and a control method capable of reducing progress in irregular deterioration in a screen of an electrophoretic panel.

An aspect of the invention relates to a wearable device including: an electrophoretic panel; and a processing circuit that performs a display process of the electrophoretic panel. The processing circuit performs a second display process different from a first display process performed in a first state when an activity state of a user is determined to transition from the first state to a second state different from the first state.

According to the aspect of the invention, when the activity state is the first state, the first display process is performed on the electrophoretic panel. When the activity state is determined to transition from the first state to the second state, the second display process is performed on the electrophoretic panel. In this way, by performing the different display processes according to the activity state of the user, for example, it is possible to reduce irregularity of the number of display updates or the number of display updates in a screen. Thus, it is possible to reduce progress of irregular deterioration in the screen of the electrophoretic panel.

According to the aspect of the invention, when the activity state is determined to be the second state, the processing circuit may perform a display update process of updating display of the electrophoretic panel as the second display process.

In this way, since the display update is not performed on the whole screen or a partial region of the screen in the first state, it is possible to reduce the progress in the irregular deterioration in the screen of the electrophoretic panel. Since the display update is performed on whole screen or a partial region of the screen in the second state, it is possible to suggest information necessary in the second state to the user.

In the aspect of the invention, the processing circuit may stop the display update process when a predetermined time has elapsed after the activity state is determined to transition from the first state to the second state.

In this way, when the activity state is determined to transition to the second state and a predetermined time has elapsed, it is possible to further reduce the number of display updates by stopping the display update process even in the second state. Thus, it is possible to further reduce the progress of the irregular deterioration in the screen of the electrophoretic panel.

In the aspect of the invention, when the activity state is determined to be the first state, the processing circuit may stop a display update process for a display object displayed on the electrophoretic panel or set an update frequency of the display object to a second update frequency lower than a first update frequency when the activity state is determined to be the first state.

In this way, since the display update process for a display object is stopped or the update frequency is reduced in the first state, it is possible to reduce the number of display updates of a display region in which the display object is displayed. Thus, it is possible to reduce the progress of the irregular deterioration in the screen of the electrophoretic panel.

In the aspect of the invention, when the activity state is determined to be the first state, the processing circuit may stop display update of a display object of which the update frequency is relatively higher between first and second display objects displayed on the electrophoretic panel or set the update frequency of the display object of which the update frequency is higher to the second update frequency.

In this way, since it is possible to reduce the number of updates of the display object of which the update frequency is relatively high between the first and second display objects, it is possible to reduce a difference in the number of updates between the display objects. Thus, it is possible to reduce the progress of the irregular deterioration in the screen of the electrophoretic panel.

In the aspect of the invention, when the activity state is determined to be the first state, the processing circuit may display a given still image on the electrophoretic panel or turn off the display.

In this way, since the still image is displayed on the electrophoretic panel in the first state or the display of the electrophoretic panel is turned off, it is possible to reduce the number of display updates. Thus, it is possible to reduce the progress of the irregular deterioration in the screen of the electrophoretic panel. Since the electrophoretic panel is not driven in the first state, it is possible to reduce power consumption in the display update.

In the aspect of the invention, when the activity state is determined to be the first state, the processing circuit may maintain display of an image displayed on the electrophoretic panel when the activity state transitions from the second state to the first state.

In this way, since the display update of the electrophoretic panel is stopped in the first state, it is possible to reduce the number of display updates Thus, it is possible to reduce the progress of the irregular deterioration in the screen of the electrophoretic panel. Since the electrophoretic panel is not driven in the first state, it is possible to reduce power consumption in the display update.

In the aspect of the invention, when the activity state is determined to be the first state, the processing circuit may perform a refreshing process for the electrophoretic panel.

In this way, the refreshing process can be performed, for example, in an unseen state or a state in which the user is assumed not to be frequently seen. Thus, it is possible to improve display quality without affecting the display at the time of sight. Since the pixels are driven in the refreshing process, a display region which has not been subjected to the display update in the second state (or of which the update frequency is low) is driven in the first state. Thus, the refreshing process is considered to contribute to uniformity of the number of display updates of the electrophoretic panel, and thus it is possible to reduce the progress of the irregular deterioration in the electrophoretic panel.

In the aspect of the invention, the processing circuit may perform a display update process for a display object displayed on a given display region of the electrophoretic panel when the activity state is determined to be the second state, and the processing circuit may perform the display update process for a display region other than the given display region when the activity state is determined to be the first state.

In this way, a difference between the number of display updates in the given display region and the number of display updates in the display region other than the given display region is reduced. Thus, it is possible to reduce the progress of the irregular deterioration in the screen of the electrophoretic panel.

In the aspect of the invention, the number of display updates of the given display region in the second state may be equal to the number of display updates of the display region other than the given display region in the first state.

In this way, it is possible to match the number of display updates in the given display region with the number of display updates in the display region other than the given display region. Thus, it is possible to further reduce the progress of the irregular deterioration in the screen of the electrophoretic panel.

In the aspect of the invention, the wearable device may further include a driving circuit that drives the electrophoretic panel based on the display processes. The processing circuit may set the driving circuit to an operation OFF state when the activity state is determined to be the first state.

In this way, by setting the driving circuit to the operation OFF state in the first state, it is possible to reduce power consumption of the driving circuit and it is possible to achieve low power consumption in the wearable device. Since the display update of the electrophoretic panel is not performed in the first state, it is possible to further reduce the progress of the irregular deterioration in the screen of the electrophoretic panel.

In the aspect of the invention, the processing circuit may set a display mode of a display object of which an update frequency is relatively higher between first and second display objects displayed on the electrophoretic panel, to a first display mode when the activity state is determined to be the first state, and the processing circuit may set the display mode to a second display mode different from the first display mode when the activity state is determined to be the second state.

In this way, the display mode of the display object of which the update frequency is relatively high can be changed according to the activity state of the user. Thus, it is possible to reduce the irregularity of for example, the number of display updates or the number of display updates in the screen. Thus, it is possible to reduce the progress of the irregular deterioration in the screen of the electrophoretic panel.

In the aspect of the invention, the processing circuit may cause the electrophoretic panel to display first display content when the activity state is determined to be the second state, and the processing circuit may cause the electrophoretic panel to display second display content different from the first display content on the electrophoretic panel when the activity state is determined to transition to the first state and subsequently transition to the second state.

In this way, whenever the activity state transitions to the second state (for example, whenever the electrophoretic panel is seen), the display content is changed. Therefore, the user can switch the display content only by performing a given operation (for example, sight) without performing a button operation, for example, while the user is running.

In the aspect of the invention, the wearable device may further include a light source that illuminates the electrophoretic panel. The processing circuit may turn off the light source when the activity state is determined to be the first state.

In this way, since the light source is turned on in the second state and the light source is turned off in the first state, it is possible to reduce the power consumption in the illumination.

In the aspect of the invention, the second state may be a state in which an activity amount of the user is different from in the first state. The processing circuit may cause the electrophoretic panel to display first display content when the activity state is determined to be the first state. The processing circuit may cause the electrophoretic panel to display second display content different from the first display content on the electrophoretic panel when the activity state is determined to be the second state.

In this way, appropriate display content can be displayed according to the activity amount of the user. Thus, convenience for the user is improved. Since the position of a display region subjected to the display update is changed by changing the display content, a reduction in the progress of the irregular deterioration in a screen of the electrophoretic panel can be expected.

In the aspect of the invention, the second state may be a state in which the user is determined to see the electrophoretic panel. The activity state may include third and fourth states in which an activity amount of the user is different from each other. The processing circuit may detect a sight state through a first determination process when the activity state is determined to be the third state. The processing circuit may detect the sight state through a second determination process different from the first determination process when the activity state is determined to be the fourth state.

In this way, whether the activity state is the state (the second state) in which the user sees the electrophoretic panel can be determined according to an appropriate determination scheme suitable for the activity amount of the user. Thus, it is possible to accurately determine whether the activity state is the state in which the user sees the electrophoretic panel, and it is possible to reduce a possibility of information not being suggested to the user at the time of the sight. Since it is possible to reduce a possibility of the display update of the electrophoretic panel not being stopped at the time of non-sight, it is possible to reduce the progress of the irregular deterioration in the screen of the electrophoretic panel.

In the aspect of the invention, the processing circuit may determine the activity state based on at least one of an orientation and a motion of the wearable device worn by the user.

In this way, based on at least one of the motion and the orientation of the wearable device, it is possible determine whether the activity state of the user transitions from the first state to the second state. Then, when the activity state is determined to transition to the second state, the second display process different from the first display process performed in the first state is performed, and thus it is possible to reduce the progress of the irregular deterioration in the screen of the electrophoretic panel.

In the aspect of the invention, based on at least one of the orientation and the motion of the wearable device, the processing circuit may determine that the activity state is a state in which the user sees the electrophoretic panel.

In this way, it is possible to determine whether the activity state of the user transitions to the second state which is the sight state. Then, by performing the second display process in the sight state, it is possible to suggest information to the user. On the other hand, by performing the first display process in the first state which is the non-sight state, it is possible to reduce the progress of the irregular deterioration in the screen of the electrophoretic panel.

Another aspect of the invention relates to a method of controlling a wearable device including an electrophoretic panel. The method includes performing a second display process different from a first display process performed in a first state when an activity state of a user is determined to transition from the first state to a second state different from the first state.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail. The embodiments to be described below do not inappropriately limit content of the invention described in the appended claims and the configurations described in the embodiments may not be all essential as resolutions of the invention.

1. Configuration

Figure 1:
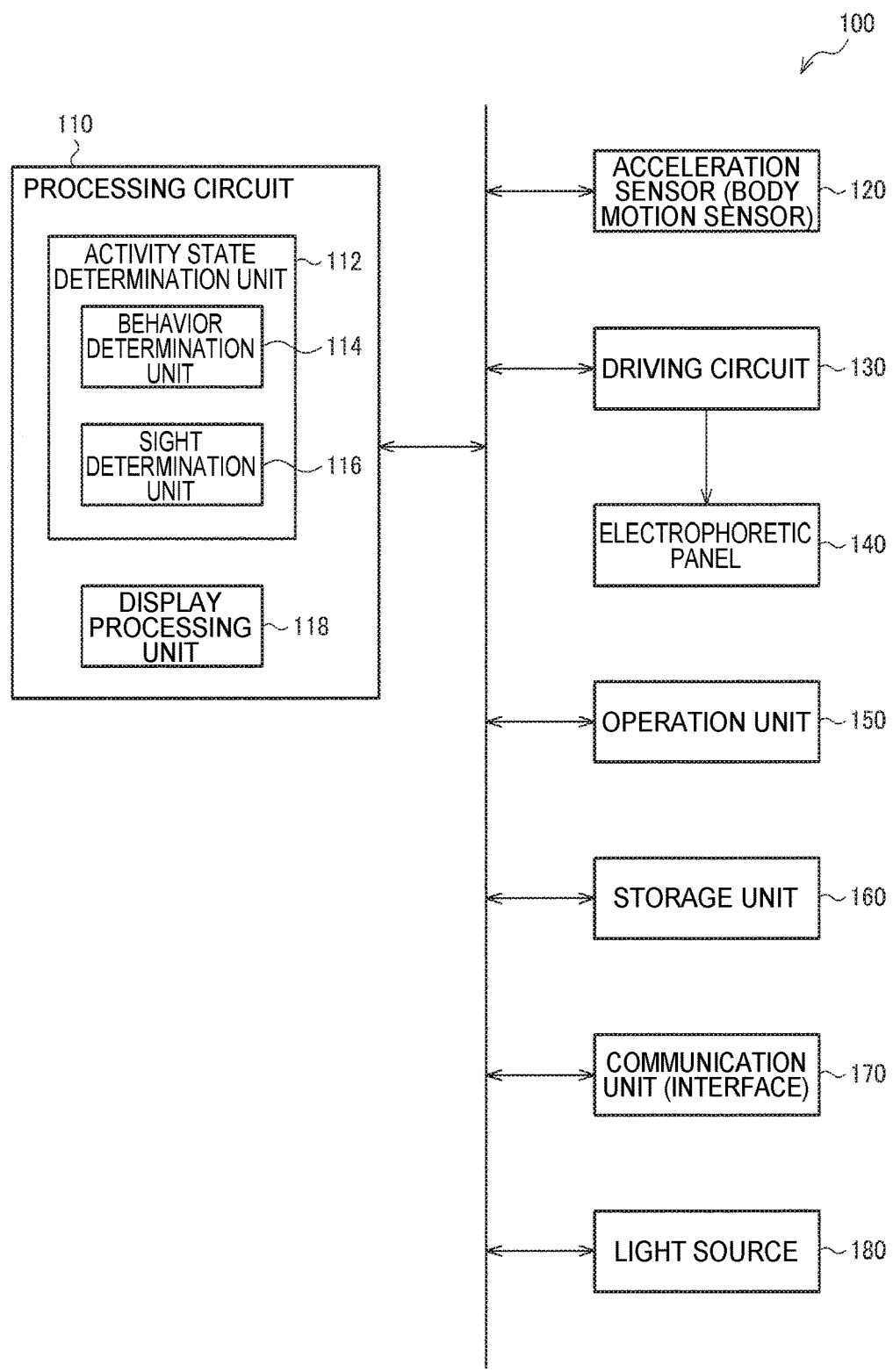
FIG. 1 is a diagram illustrating a configuration example of a wearable device according to an embodiment.

FIG. 1 is a diagram illustrating a configuration example of a wearable device according to the embodiment. A wearable device 100 includes a processing circuit 110, and an electrophoretic panel 140 (an electrophoretic display). The wearable device 100 can include an acceleration sensor 120, a driving circuit 130 (a display driver), an operation unit 150 (an operation device), a storage unit 160 (a memory), a communication unit 170 (a communication circuit and an interface), and a light source 180 (an illumination device). The embodiment is not limited to the configuration of FIG. 1 and various modifications can be made by omitting some of the constituent elements or adding other constituent elements.

The wearable device 100 is a device which can be worn by a user (mounted a position of one part of the body of the user) and is a device that suggests information displayed on a display unit (in the embodiment, the electrophoretic panel 140) to the user who sees (visually recognizes) the display unit. Hereinafter, an example of a case in which the wearable device 100 is worn on an arm will be described, but a mounting position is not limited to the arm. Hereinafter, an example of a case in whish the wearable device 100 displays time information or time measurement information (information measured by a stopwatch function) will be described, but information displayed by the wearable device 100 is not limited thereto. For example, the wearable device 100 may be a biological detection device (wearable health device) such as a pulsimeter, a pedometer, and an activity meter.

The acceleration sensor 120 is a sensor that detects acceleration of the wearable device 100. The acceleration sensor 120 detects acceleration (a magnitude or a magnitude and a direction) generated by a motion of the wearable device 100. Further, acceleration of gravity (direction) may be detected. For example, an electrostatic capacity type acceleration sensor that detects a change in an electrostatic capacity between an electrode of a movable unit and an electrode of a fixed unit as acceleration information can be adopted, or a piezoelectric resistance type acceleration sensor that detects a resistant value of a piezoelectric element mounted on a piezoelectric element at the time of additional displacement as acceleration information can be adopted. The invention is not limited to the acceleration sensor and any sensor may be adopted as long as the sensor is a body motion sensor that detects a motion of the wearable device 100. For example, a gyro sensor that detects angular velocity may also be adopted.

The electrophoretic panel 140 is a reflective display panel in which an electrophoretic scheme is used. As the electrophoretic scheme, a cell is formed between a first electrode (an optical transparent electrode or a pixel electrode) and a second electrode (a counter electrode), a dispersion medium and charged particles are sealed in the cell, and charged particles are moved by applying a voltage between the electrodes. For example, when the charged particles are white particles with a positive charge and black particles with a negative charge and the first electrode side is set to a positive voltage with respect to the second electrode, the black particles are moved to the first electrode side and black display is achieved. When the first electrode side is set to a negative voltage with respect to the second electrode, the white particles are moved to the first electrode side and white display is achieved. Various specific configurations of the electrophoretic panel 140 can be assumed. For example, there are a capsule type in which, for example, a capsule that seals a dispersion medium and charged particles is disposed between electrodes or a partition wall type in which an electrophoretic layer that is formed between first and second substrates disposed to face each other and has a dispersion medium (including charged particles) partitioned by partition walls in a plurality of cells is formed.

The driving circuit 130 is a circuit that outputs a driving signal (a driving voltage waveform or a driving voltage pattern) that drives the electrophoretic panel 140. That is, a driving signal corresponding to a gray scale displayed by each pixel is output to an electrode of the pixel of the electrophoretic panel 140 so that an image is displayed on the electrophoretic panel 140. The driving circuit 130 selects the region of a part of the electrophoretic panel 140 and is configured to drive only pixels of the region. For example, only a region in which updating is performed from a previously written image is written (display update). The driving circuit 130 is realized by, for example, an integrated circuit device.

The operation unit 150 is a device used for a user to operate the wearable device 100. For example, the operation unit 150 includes a button or a touch panel.

The storage unit 160 is, for example, a RAM or a nonvolatile memory. For example, the storage unit 160 functions as a working memory of the processing circuit 110, a memory that temporarily stores various kinds of data (for example, data of acceleration acquired by the acceleration sensor 120 or data of biological information detected in the case of a biological information detection device), a memory that stores setting information of the wearable device 100.

The communication unit 170 is a circuit that performs communication between the wearable device 100 and an external device (for example, an information processing device or a portable information processing terminal). For example, setting information is transmitted from the external device to the wearable device 100 via the communication unit 170. Alternatively, various kinds of data (for example, data of biological information detected in the case of a biological information detection device) is transmitted from the wearable device 100 to the external device via the communication unit 170.

The light source 180 is a light source that generates illumination light to illuminate the electrophoretic panel 140. Since the electrophoretic panel 140 is of a reflective type, illumination light is emitted from a display surface (a side on which the first electrode which is a transparent electrode is disposed) of the electrophoretic panel 140.

The processing circuit 110 performs, for example, data processing of processing various kinds of data, a control process of controlling the wearable device 100, and a display process of displaying an image on the electrophoretic panel 140. The processing circuit 110 is, for example, a processor. The processor includes at least one of a circuit that processes a digital signal and a circuit that processes an analog signal. For example, the processor is realized by a micro processing unit (MPU), a central processing unit (CPU), a digital signal processor (DSP), or the like. In this case, a function of the processing circuit 110 is realized by storing a program (a command or software) that describes a function of the processing circuit 110 in the storage unit 160 (for example, a ROM or a nonvolatile memory) and causing the processing circuit 110 to read and execute the program. Alternatively, the processor may also be realized by dedicated hardware such as an application specific integrated circuit (ASIC).

As illustrated in FIG. 1, the processing circuit 110 includes an activity state determination unit 112 and a display processing unit 118. When the processing circuit 110 is an MPU, for example, each unit is realized by a program module.

The activity state determination unit 112 acquires (detects) at least one of a motion and an orientation of the wearable device 100 based on acceleration detected by the acceleration sensor 120 and determines a state of the wearable device 100 based on the information. Specifically, the activity state determination unit 112 determines an activity state of the user who wears the wearable device 100. For the activity state, behavior determination is performed to determine which behavior is executed by a user and use state determination is performed to determine whether the user uses the wearable device 100 in a given use state. Specifically, the activity state determination unit 112 includes a behavior determination unit 114 that performs the behavior determination and a sight determination unit 116 (a use state determination unit) that performs the use state determination.

Hereinafter, an example of a case in which whether the user is running (or working) or is in a daily life state (non-exercise state) is determined will be described as the behavior determination, but the behavior determination is not limited thereto. For example, an exercise state in which the user is performing certain sports and a non-exercise state may be determined or an awakening state and a sleeping state may be determined. Hereinafter, an example of a case in which a sight state in which the user holds the electrophoretic panel 140 at able orientation is determined as the use state determination will be described, but the use state determination is not limited thereto. For example, whether the user wears the wearable device 100 may be determined.

The display processing unit 118 controls the driving circuit 130 and performs a display process (display control) of displaying an image on the electrophoretic panel 140. For example, the display processing unit 118 transmits display data to the driving circuit 130. The driving circuit 130 generates a driving voltage waveform corresponding to the display data, and drives the electrophoretic panel 140. Alternatively, the display processing unit 118 generates a driving voltage waveform corresponding to the display data and outputs the driving voltage waveform to the driving circuit 130, and the driving circuit 130 amplifies the driving voltage waveform and drives the electrophoretic panel 140. The display processing unit 118 controls display content (display details: for example, date and year, hour and minute, time measurement information, or biological information) which is displayed on the electrophoretic panel 140. The display processing unit 118 sets (controls) a display region in which an image writing (display update or pixel driving) is performed based on the display content. The display processing unit 118 performs a process of writing white or black on all the pixels of the electrophoretic panel 140 or a process of writing a predetermined still image at a predetermined timing (for example, an operation of the driving circuit 130 is turned off when the wearable device 100 is powered off). The display processing unit 118 performs a refreshing process of the electrophoretic panel 140 at a predetermined timing (for example, the user enters a predetermined activity state for each display update by a predetermined number of times).

Figure 2:
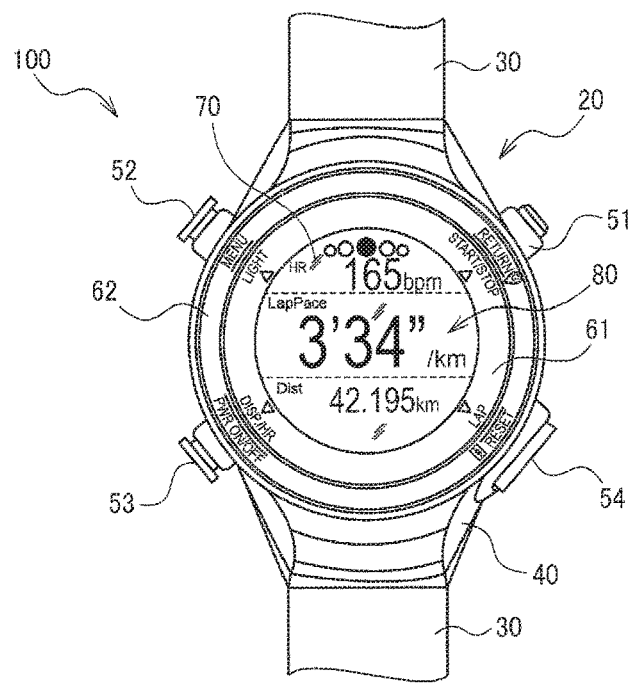
FIG. 2 is a diagram illustrating a configuration example of a wristwatch type device (wrist device) as an example of the wearable device.

FIG. 2 is a diagram illustrating a configuration example of a wristwatch type device (wrist device) as an example of the wearable device 100. The wearable device 100 is not limited to a wristwatch type device and a device that is worn on a given part of the body may be used.

FIG. 2 illustrates the wearable device 100 when viewed in a plan view of a display surface of the electrophoretic panel 140. The wearable device 100 includes a device body 20 and a band 30 (mounting mechanism) used to mount the device body 20 on a wrist (a given part of the body) of the user.

The device body 20 includes a case 40 in which an opening is formed on an opposite side (front side) to a mounting side (rear side) on the user. A bezel 62 is installed on the outside of the case 40 and a windshield plate 70 (for example, a glass plate) is formed on the inside of the bezel 62 to block the opening of the case 40. Operation buttons 51 to 54 are installed on the side surface of the case. The operation buttons 51 to 54 correspond to the operation unit 150 in FIG. 1 and the operation buttons 51 to 54 are operated to set an operation mode, display content, or the like of the wearable device 100. An electrophoretic panel 80 is installed under the windshield plate 70 (inside the case 40) so that the display surface faces the windshield plate 70. The electrophoretic panel 80 corresponds to the electrophoretic panel 140 in FIG. 1. A bordering plate 61 (a ring-shaped plate) is installed between the electrophoretic panel 140 and the windshield plate of an outer edge of the windshield plate 70. The electrophoretic panel 140 can be seen through the opening of the bordering plate 61.

The processing circuit 110 (the display processing unit 118) in FIG. 1 performs a display process according to the embodiment in a region which can be seen at least from the bordering plate 61 on the display surface of the electrophoretic panel 140. The display process according to the embodiment may be performed on the whole display surface in addition to a region other than the region which can be seen from the bordering plate 61.

2. Operation

As described above, in the wearable device 100 according to the embodiment, the electrophoretic panel 140 is used as a display panel. The electrophoretic panel has advantages that a visible angle of view is larger than in a liquid crystal display panel or the like and visibility is high even in a bright location (outdoor or under sunlight) since the electrophoretic panel is of a reflective type. When writing is performed once on the pixels of the electrophoretic panel, the written gray scale is maintained. Therefore, in a case where the same display image is displayed continuously, the power consumption is low.

However, information suggested to the user by the wearable device 100 includes information of which an update frequency is high (for example, a second digit of a time, a second digit of time measurement (stopwatch function), a pulse, or the number of steps). The wearable device 100 preferably consumes low power for a battery or a battery cell normally and preferably reduces power consumption for driving the electrophoretic panel. Therefore, it is considered to perform display update (pixel driving) only a display region in which an image is updated. However, the electrophoretic panel has characteristics in which the photoelectric panel further deteriorates as the number of display updates increases. Therefore, when display of a partial display region is frequently updated, a difference may occur in the degree of deterioration between the display region and other display regions. For example, contrast of display deteriorates chronologically because a motion of charged particles in the medium becomes worse, the charge of the charged particles is changed, and a response to a driving signal is changed. When such deterioration occurs, there is a possibility that the color of a display region of which display is frequently updated is seen differently (seen gray) compared to the other display regions.

Accordingly, the wearable device 100 according to the embodiment includes the electrophoretic panel 140 and the processing circuit 110 (processor) that performs a display process of the electrophoretic panel 140. The processing circuit 110 performs a second display process different from the first display process performed in a first state when an activity state of a user is determined to transition from the first state to a second state different from the first state.

A state of the user and the wearable device 100 at the time of determining the activity state is, for example, a state in which the user wears the wearable device 100. The invention is not limited thereto. The state may be a state in which a body motion of the user is delivered to the wearable device 100. For example, the state may be a state in which the user carries the wearable device 100.

Figure 3:
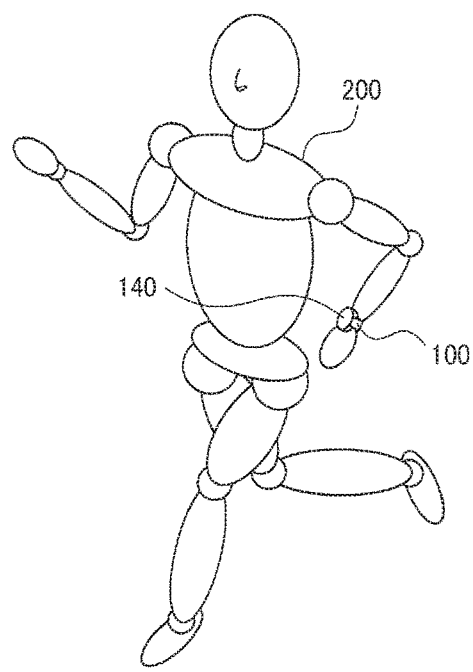
FIG. 3 is a diagram illustrating a first example of a first state of an activity state.
Figure 4:
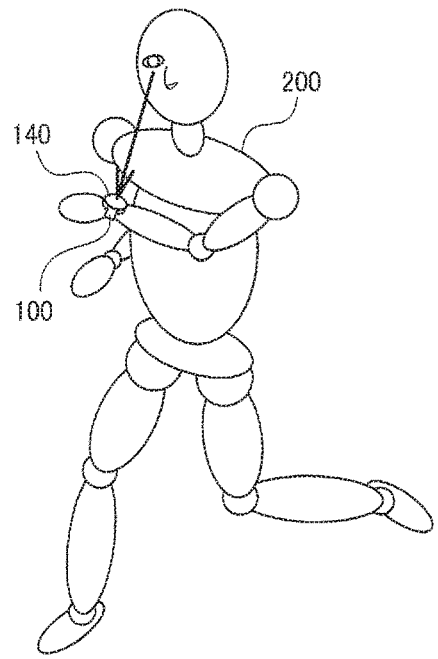
FIG. 4 is a diagram illustrating a first example of a second state of an activity state.

FIG. 3 illustrates a first example of the first state of the activity state. FIG. 4 illustrates a first example of the second state of the activity state. In the examples, the wearable device 100 is a wristwatch type device and is worn on the left wrist of a user 200. The first state is a state in which the user 200 is running or walking and the arms of the user 270 are naturally shaken. That is, a direction of the display surface of the electrophoretic panel 140 is changed in accordance with a motion of the arm and the user 200 does not see the display surface. On the other hand, the second state is a state in which the user 200 is running or walking and the user 200 maintains a position at which the user 200 can see the display surface of the electrophoretic panel 140.

Figure 5:
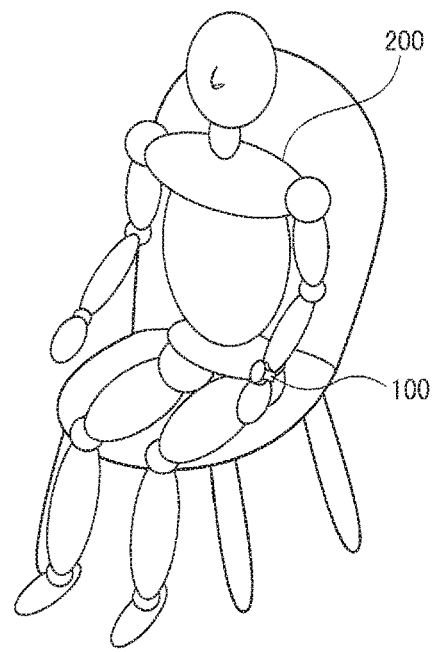
FIG. 5 is a diagram illustrating a second example of a first state of an activity state.
Figure 6:
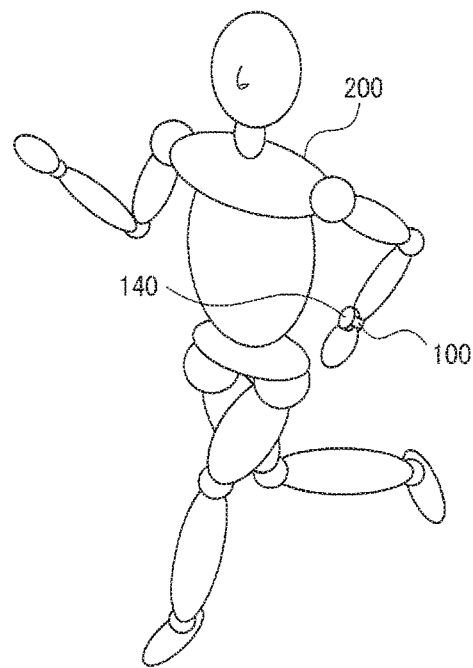
FIG. 6 is a diagram illustrating a second example of a second state of an activity state.

FIG. 5 illustrates a second example of the first state of the activity state. FIG. 6 illustrates a second example of the second state of the activity state. In the examples, the wearable device 100 is a wristwatch type device and is worn on the left wrist of a user 200. The first state is a daily life state (a non-exercise state) of the user 200. That is, the first state is a state in which an exercise intensity of an activity is not large and an exercise intensity is relatively small (for example, an average value of acceleration detected by the acceleration sensor is small). On the other hand, the second state is a state in which the user 200 is performing an exercise. That is, the second state is a state in which the exercise intensity of an activity is large (for example, an average value of acceleration detected by the acceleration sensor is large). FIG. 6 illustrates a state in which the user 200 is running or walking, but the invention is not limited thereto. The exercise intensity of the activity may be relatively larger than in the first state. For example, the first state may be a sleeping state and the second state may be a daily life state (awakening state).

The activity state determination unit 112 of the processing circuit 110 determines whether the activity state is the first state or the activity state is the second state based on a detection result of the acceleration sensor 120 (body motion sensor). Then, when the activity state determination unit 112 determines that the activity state transitions from the first state to the second state, the display processing unit 118 changes the first display process to the second display process. For example, in the examples of FIGS. 3 and 4, the sight determination unit 116 of the activity state determination unit 112 determines whether the activity state is the non-sight state or the sight state. In the examples of FIGS. 5 and 6, the behavior determination unit 14 of the activity state determination unit 112 determines whether the activity state is a daily life state or an exercise state. A determination scheme will be described in detail below.

The first and second display processes are display processes in which at least one of, for example, a display update frequency, a region in which the display update is performed, display content, and a kind of display update (for example, normal image display and a refreshing process) is different. More specifically, the first display process is a display process in which a progress of deterioration of the electrophoretic panel 140 (a difference in the degree of progress of the deterioration in a screen) is less than in the second display process.

In the examples of FIGS. 3 and 4, since the first state is a state in which the user 200 does not see the wearable device 100, information may be basically displayed on the electrophoretic panel 140 in the second state (sight state). In the examples of FIGS. 5 and 6, in the exercise state, information of which an update frequency is higher or more content information is assumed to be displayed than in the daily life state. Therefore by changing the display process in accordance with the first state or the second state, it is possible to perform an appropriate display process according to the activity state and it is possible to reduce the progress of deterioration of the electrophoretic panel 140 (the difference in the degree of progress of the deterioration in a screen). Specifically, when a display process of reducing the progress of the deterioration of the electrophoretic panel 140 (for example, decreasing an update frequency) is performed in the first state and the activity state is determined to transition from the first state to the second state, a display process of suggesting information necessary for the second state (for example, increasing the update frequency) is performed. In this way, it is possible to reduce the progress of the deterioration of the electrophoretic panel 140 (the difference in the degree of progress of the deterioration in a screen) in the first state.

More specifically, the processing circuit 110 performs a display update process of updating display of the electrophoretic panel 140 as the second display process when the activity to determined to be the second state.

The display update process is a process of driving pixels of the electrophoretic panel 140 (writing a gray scale or rewriting). The driving of the pixels may be performed on the whole screen of the electrophoretic panel 140 or may be performed on only a partial region of the screen. For example, the display update process is, for example, transition from white display or black display to normal display (display of an image, text, or the like) or transition from a refreshing process to normal display. A case in which display update is performed when the driving circuit 130 transitions from an operation OFF state to an operation state is also equivalent to a display update process.

In this way, since the display update is not performed in the whole screen or a partial region of the screen in the first state, it is possible to reduce progress of the deterioration of the electrophoretic panel 140 (the difference in the degree progress of the deterioration in a screen). Since the display update is performed in the whole screen or a partial region of the screen in the second state, it is possible to suggest information necessary in the second state to the user.

In the embodiment, the processing circuit 110 stops the display update process when the activity state is determined to transition from the first state to the second state and subsequently a predetermined time has elapsed.

The predetermined time may be a constant time irrespective of which type of state the second state is or may a different time according to which type of state the second state is. For example, when the activity state transitions to the sight state of FIG. 4 and subsequently a first predetermined time has elapsed, the display update process may be stopped. When the activity state transitions to the exercise state of FIG. 6 and subsequently a second predetermined time different from the first predetermined time has elapsed, the display update process may be stopped. When the daily life state of FIG. 5 is set to be a third state and the exercise state of FIG. 6 is set to be a fourth state, the activity state may transition from the non-sight state (the first state) to the sight state (the second state) in the daily life state. Thereafter, when the first predetermined time has elapsed, the display update process may be stopped and the non-sight state may transition to the sight state in the exercise state. Thereafter, when the second predetermined time different from the first predetermined time has elapsed, the display update process may be stopped.

In this way, when the activity state is determined to transition to the second state and subsequently predetermined time has elapsed, the display update process is stopped even in the second state, so that the progress of the deterioration in the electrophoretic panel 140 (the difference in the degree of progress of the deterioration in a screen) can be further reduced. Since a time taken to perform the display update process is shortened, it is possible to reduce current consumption in the display update and it is possible to achieve low power consumption in the wearable device 100. The display update process may be stopped, and further the driving circuit 130 may be set to an operation OFF state. In this way, it is possible to further achieve low power consumption in the wearable device 100.

In the embodiment, when the activity state is determined to be the first state, the processing circuit 110 stops the display update process for a display object displayed on the electrophoretic panel 140 or sets an update frequency of the display object to a second update frequency lower than a first update frequency when the activity state is determined to be the first state.

The display object is an object that is displayed in a screen of the electrophoretic panel 140 and is an object that is displayed in a given display region corresponding to the object. For example, an hour, a minute, and a second of time display are each display objects and display content called time display is formed by a combination of the display objects. The display objects are not limited thereto. Various objects such as text, signs, images, and marks can be assumed.

According to the embodiment, since the display update process for the display object is stopped or the update frequency is reduced in the first state, it is possible to reduce the progress of the electrophoretic panel 140 (the difference in the degree of progress of the deterioration in a screen).

In the embodiment, when the activity state is determined to be the first state, the processing circuit 110 stops the display update for a display object of which an update frequency is relatively high between first and second display objects displayed on the electrophoretic panel 140 or sets the update frequency of the display object of which the update frequency is high as the second update frequency. The second update frequency is an update frequency lower than the first update frequency in the first state of the display object of which the update frequency is relatively high.

Figure 7:
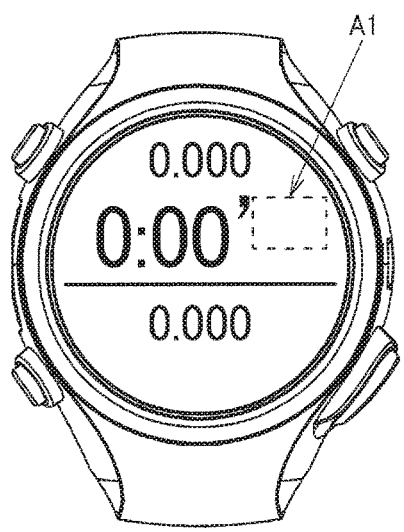
FIG. 7 is a diagram illustrating a first example of a display process according to the embodiment.
Figure 7:
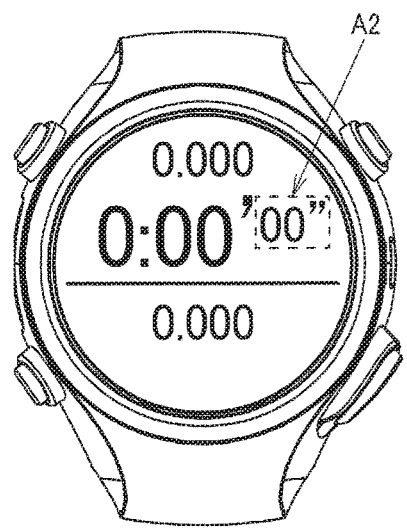

FIG. 7 is a diagram illustrating a first example of the display process according to the embodiment. A dotted rectangle illustrated in FIG. 7 is illustrated for description and is not actually displayed. In FIG. 7, for example, a time measurement screen in which a measurement time such as a lap time and a split time in running or the like is displayed is illustrated. The measurement time includes information regarding an hour, a minute, and a second. The second is a display object of which an update frequency is higher than an hour and a minute. In this case, as indicated by A2 of FIG. 7, a second is displayed in the second state and second display is updated at intervals of 1 second. As indicated by A1, the display update of a second is stopped in the first state. FIG. 7 illustrates a case in which a display region of a second is displayed white and subsequently the display update of a second stopped. For example, the display update of a second may be stopped without displaying the display region of a second white, and a numerical value of a second when the activity state transitions from the second state to the first state may be continuously displayed without change. In the first state, the update frequency may be decreased without stopping the display update of a second. For example, the display of a second may be updated at intervals of 1 second in the second state, and the display of a second may be updated at intervals of 10 seconds in the first state.

According to the embodiment, since it is possible to decrease the number of updates of the display object of which the update frequency is relatively high among the plurality of display objects, it is possible to reduce a difference in the number of updates between the display objects. Thus, it is possible to reduce the progress of the deterioration in the electrophoretic panel 140 (the difference in the degree of progress of the deterioration in a screen).

In the embodiment, when the activity state is determined to be the first state, the processing circuit 110 may cause the electrophoretic panel 140 to display a given still image or may turn off the display.

Figure 8:
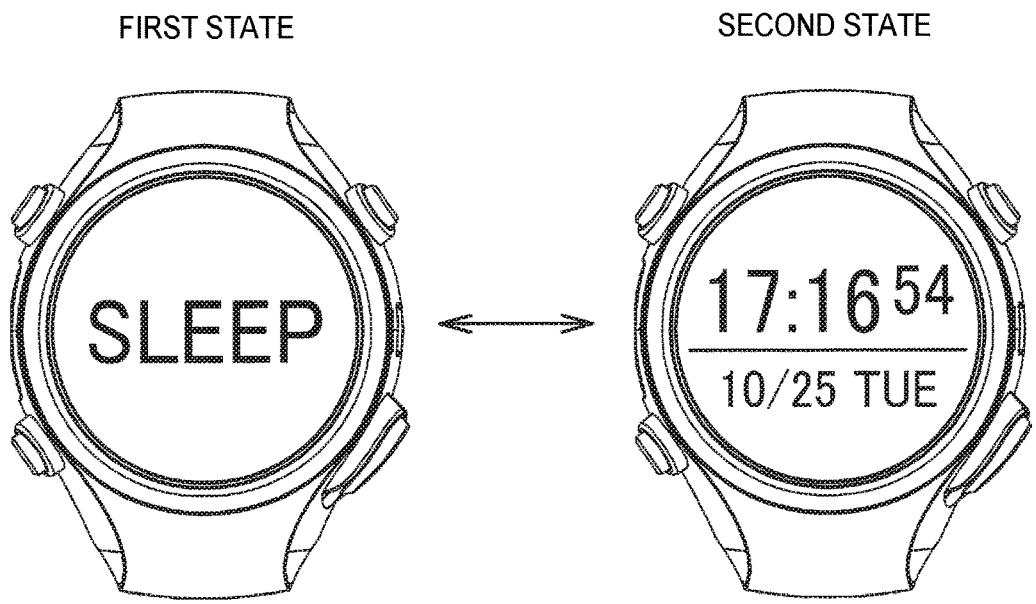
FIG. 8 is a diagram illustrating a second example of the display process according to the embodiment.

FIG. 8 is a diagram illustrating a second example of the display process according to the embodiment. In FIG. 8, a timepiece and a calendar (for example, a month, a date, and a day of week) are displayed in the second state, the display is updated to a given still image when the activity state transitions from the second state to the first state, and subsequently the display is not updated in the first state (the given still image remains displayed). In FIG. 8, a text image is displayed as the given still image, but the invention is not limited thereto. An image of a pattern, a photo, or the like may be displayed.

Figure 9:
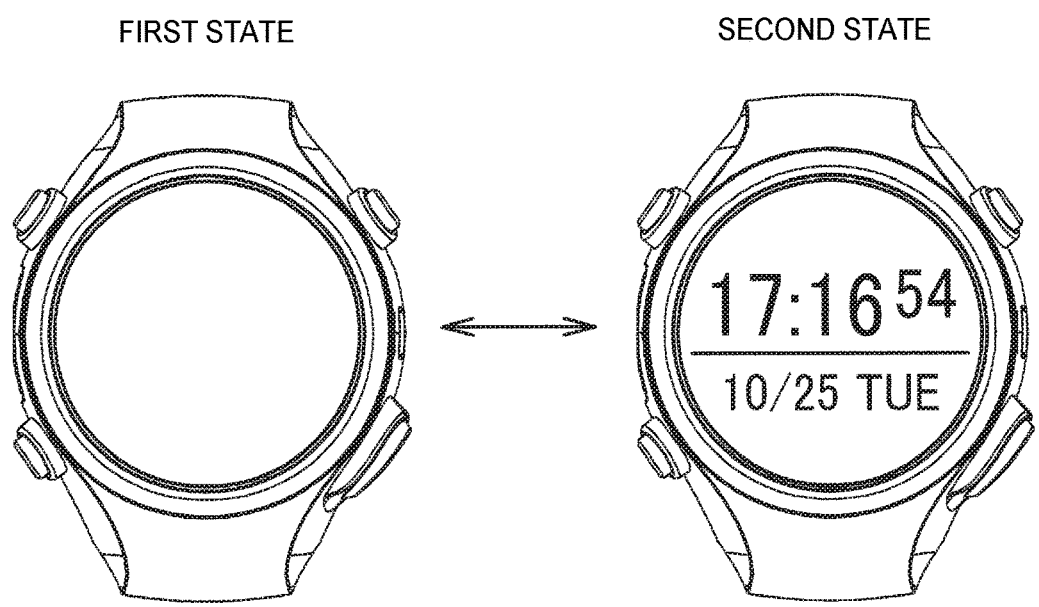
FIG. 9 is a diagram illustrating a third example of the display process according to the embodiment.

FIG. 9 is a diagram illustrating a third example of the display process according to the embodiment. In FIG. 9, the timepiece and the calendar are displayed in the second state, the whole screen is updated to white display when the activity state transitions from the second state to the first state, and subsequently the display is not updated in the first state (the white display still remains). Turning off the display is not limited to the white display and an image such as text, a picture, a pattern, a figure, or a photo may not be displayed. For example, black display or display of the whole screen with a single gray scale may be achieved.

According to the embodiment, since a still image is displayed on the electrophoretic panel 140 in the first state or the display of the electrophoretic panel 140 is turned off, it is possible to reduce the progress of the deterioration in the electrophoretic panel 140 (the difference in the degree of progress of the deterioration in a screen). Since the electrophoretic panel 140 not driven in the first state, it is possible to reduce power consumption in the display update.

According to the embodiment, when the activity state is determined to be the first state, the processing circuit 110 may maintain the display of an image displayed on the electrophoretic panel 140 when the activity state transitions from the second state to the first state.

That is, the processing circuit 110 stops the display update when the activity state transitions from the second state to the first state. Thereafter, the display update is not performed in the first state. Thus, the display of the image displayed on the electrophoretic panel 140 at the time of the transition from the second state to the first state consequently remains. For example, when the timepiece and the calendar are displayed in the second state, the display of the timepiece and the calendar at the time of the transition from the second state to the first state remains unchanged without being updated.

According to the embodiment, since the display update of the electrophoretic panel 140 is stopped in the first state, it is possible to reduce the progress of the deterioration in the electrophoretic panel 140 (the difference in the degree of progress of the deterioration in a screen). Since the electrophoretic panel 140 is not driven in the first state, it is possible to reduce power consumption in the display update.

In the embodiment, when the activity state is determined to be the first state, the processing circuit 110 may perform a refreshing process for the electrophoretic panel 140.

The refreshing process is a process of returning (refreshing or initializing) the positions of particles in the cells of the electrophoretic panel 140 to given positions and is realized, for example, by applying a predetermined driving voltage waveform (for example, black and white alternation writing) to the pixels of the electrophoretic panel 140.

When a certain gray scale is written to the pixels in the electrophoretic panel 140, there is a possibility of the actually written gray scale being changed (having an error) depending on previously written gray scale of the pixels. Therefore, in a display region in which updating of second display or the like is repeated, there is a possibility of contrast deteriorating or a ghost occurring. According to the embodiment, since the refreshing process can be performed in an unseen state (or a daily life state assumed not to be frequently seen) it is possible to improve display quality without affecting the display at the time of sight. Since the pixels are driven in the refreshing process, a display region which has not been subjected to the display update in the second state (or of which the update frequency is low) is driven in the first state. Thus, the refreshing process contributes to uniformity of the number of display updates of the electrophoretic panel 140, and thus a reduction in the progress of the deterioration in the electrophoretic panel 140 (the difference in the degree of progress of the deterioration in a screen) can be expected.

In the embodiment, when the activity state is determined to be the second state, the processing circuit 110 may perform the display update process for the display object displayed in a given display region of the electrophoretic panel 140. The processing circuit 110 may perform the display update process for a display region other than the given display region when the activity state is determined to be the first state. For example, when the activity state is determined to transition from the second state the first state, the display update process for the display region other than the given display region is performed.

For example, in FIG. 7, the display region (the inside of the dotted rectangle) of a second indicated by A2 is the given display region. In this case, in the first state, the display region (the outside of the dotted rectangle) other than the display region of a second is displayed and updated. For example, after white display and black display are performed in a display region other than the display region of a second the predetermined number of times, the original image is written again. Alternatively, after the refreshing process is performed on the display region other than the display legion of a second, the original image is written again.

According to the embodiment, a difference between the number of display updates in the given display region and the number of display updates in the display region other than the given display region is decreased. Thus, it is possible to reduce the progress of the deterioration in the electrophoretic panel 140 (the difference in the degree of progress of the deterioration in a screen).

In the embodiment, the number of display updates of the given display region in the second state is the same as the number of display updates of the display region other than the given display region in the first state.

The display update performed once corresponds to writing one gray scale once (a driving voltage waveform corresponding to the gray scale is applied to the pixels once). In the case of the refreshing process, the refreshing process performed once may be the display update performed once or each repetition of black and white may be the display update performed once.

According to the embodiment, the number of display updates in the given display region can be caused to match the number of display updates in the display region other than the given display region. Thus, it is possible to further reduce the progress of the deterioration in the electrophoretic panel 140 (the difference in the degree of progress of the deterioration in a screen).

In the embodiment, the wearable device 100 includes the driving circuit 130 that drives the electrophoretic panel 140 through a display process. The processing circuit 110 may set the driving circuit 130 to an operation OFF state when the activity state is determined to be the first state.

The operation OFF state is, for example, a state in which the driving circuit 130 does not drive the electrophoretic panel 140 (for example, an output of high impedance or a constant voltage state), a state in which a bias current is not supplied to the driving circuit 130, or a state in which a bias current of the driving circuit 130 is reduced. Given display update (for example, white display, black display, display of a given still image) may be performed, and thus the driving circuit 130 may be set to the operation OFF state, or the driving circuit 130 may be set to the operation OFF state without performing the display update (in the latter case, display immediately before the operation OFF state is set is maintained).

According to the embodiment, by setting the driving circuit 130 to the operation OFF state in the first state, it is possible to reduce power consumption of the driving circuit 130 and achieve low power consumption in the wearable device 100. Since the display update for the electrophoretic panel 140 in the first state is not performed, it is possible to reduce the progress of the deterioration in the electrophoretic panel 140 (the difference in the degree of progress of the deterioration in a screen).

In the embodiment, the processing circuit 110 may set a display mode to a first display mode of a display object of which an update frequency is relatively high between the first and second display objects displayed on the electrophoretic panel 140 when the activity state is determined to be the first state. The processing circuit 110 may set the display mode to a second display mode different from the first display mode when the activity state is determined to be the second state.

The display mode is a method (mode) of suggesting content to be suggested to the user. A difference in the display mode means a difference in the suggestion method (mode) although the content to be suggested to the user is basically the same. Specifically, the first display mode is a display mode in which the progress of the deterioration in the electrophoretic panel 140 (the difference in the degree of progress of the deterioration in a screen) is less than in the second display mode.

Figure 10:
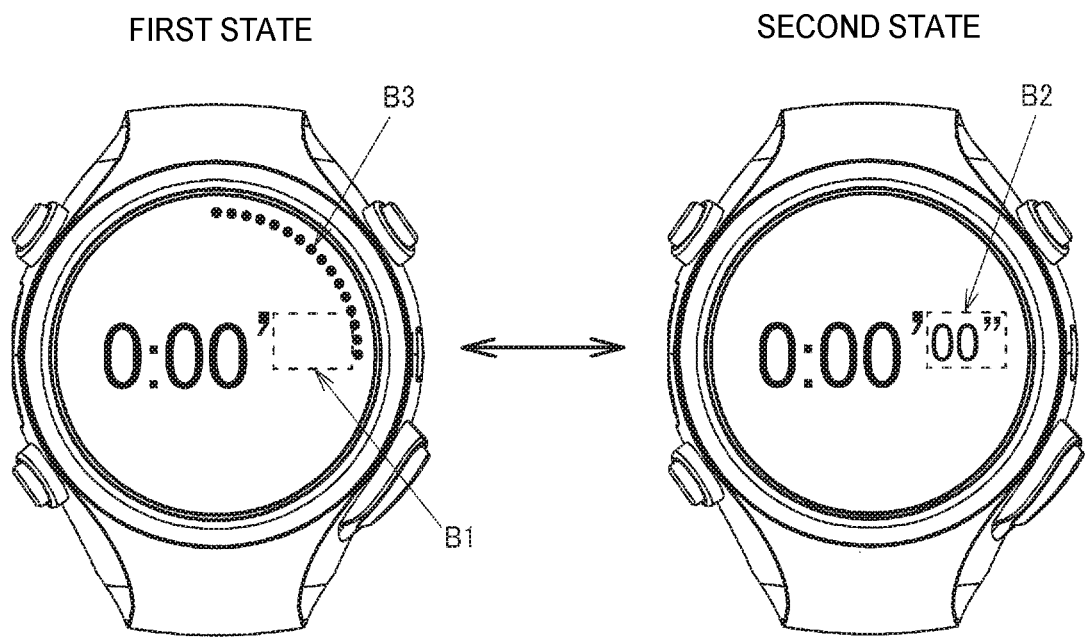
FIG. 10 is a diagram illustrating a fourth example of the display process according to the embodiment.

FIG. 10 is a diagram illustrating a fourth example of the display process according to the embodiment. A dotted rectangle illustrated in FIG. 10 is illustrated for description and is not actually displayed. In the example of FIG. 10, an hour, a minute, and a second are displayed. The second is a display object of which an update frequency is the highest among the hour, the minute, and the second. As indicated by B2 of FIG. 10, in the second state, a second is displayed as a number and the number is updated at an interval of 1 second. On the other hand, in the first state, as indicated by B1, numeral display of a second is turned off (or example, a display region of a second is displayed white). As indicated by B3, dots (black circles) are displayed to be circled along the outer edge (inner circumference of the outer edge) of a screen. For example, a dot is added clockwise one by one per second. Alternatively, an outlined dot (white dot) is displayed in advance along the outer edge of the screen and the dot is changed to a black circle clockwise one by one per second.

According to the embodiment, by differentiating the display mode of the display object of which the update frequency is relatively high between the first and second states, it is possible to set the display mode in which the progress of the deterioration in the electrophoretic panel 140 (the difference in the degree of progress of the deterioration in a screen) is small in the first state in which the user does not see (or the frequency of sight is assumed to be set low). For example, since one dot is subjected to the display update only once per 60 seconds in the example of FIG. 10, the update frequency is less than in numerical display of a second. Since the dots are displayed in a different region from the numerical display of a second, the region subjected to the display update is disperse. According to the embodiment, the appropriate display mode can be set in the second state in which the user sees (or the frequency of sight is assumed to be high). For example, since a second is displayed as a number in the example of FIG. 10, the user can easily recognize the accurate number of seconds.

In the embodiment, when the activity state is determined to be the second state, the processing circuit 110 causes the electrophoretic panel 140 to display first display content on the electrophoretic panel 140. The processing circuit 110 causes the electrophoretic panel 140 to display second display content different from the first display content when the activity state is determined to transition to the first state and subsequently to the second state.

Figure 11:
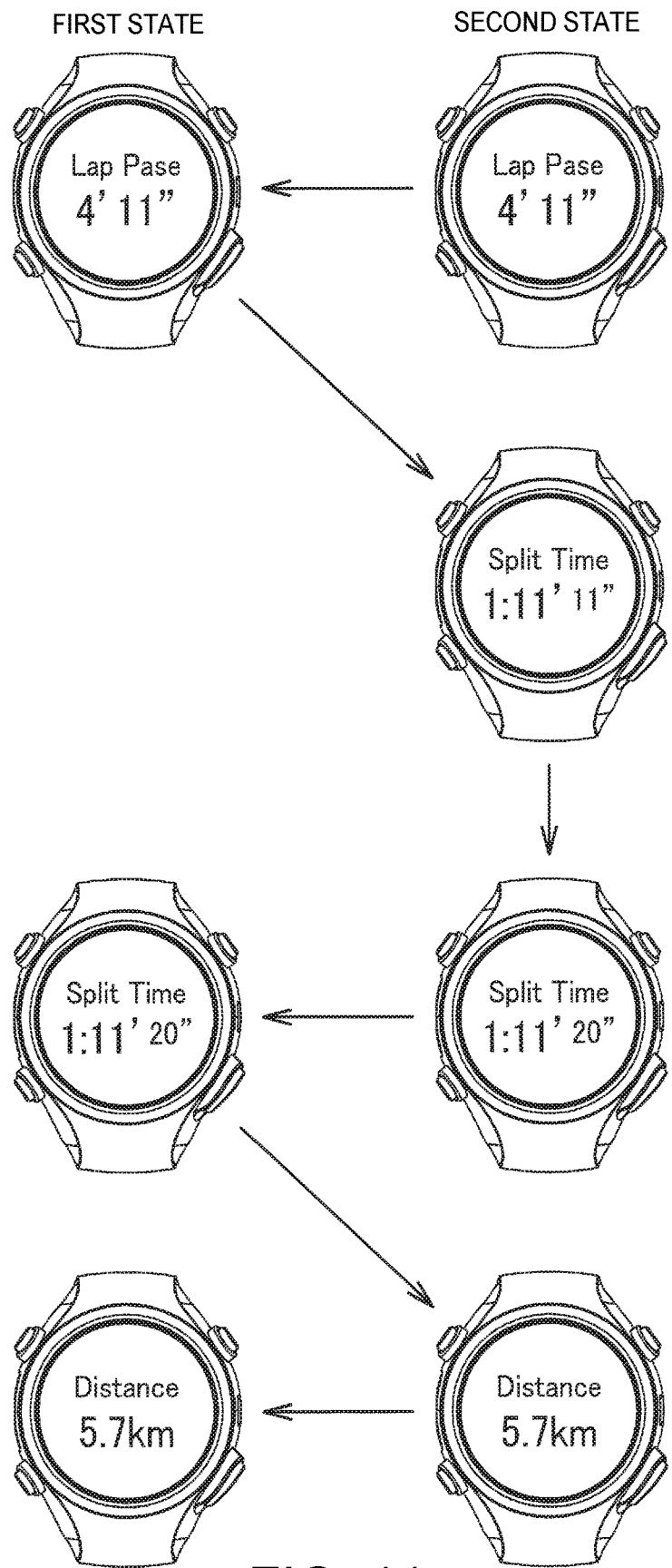
FIG. 11 is a diagram illustrating a fifth example of the display process according to the embodiment.

FIG. 11 is a diagram illustrating a fifth example of the display process according to the embodiment. As illustrated in FIG. 11, a lap pace (lap time) is displayed in the first second state. The lap pace is a time taken to pass a predetermined distance (or once around a track). When the activity state transitions to the first state, the display update is stopped and display of the lap pace is maintained. When the activity state transitions to the second state, a split time is displayed. The split time is a time taken for notification from a start spot to a current spot. The split time is updated during the second state, the display update is stopped when the activity state transitions to the first state, and the immediately previous display of the split time is maintained. When the activity state transitions to the third second state, a distance from the start spot to the current spot is displayed. For example, the wearable device 100 includes, for example, a positioning device (for example, a Global Positioning System (GPS) not illustrated). The processing circuit 110 calculates a distance based on a positioning result of the positioning device. Alternatively, the processing circuit 110 measures the number of steps in a detection result of the acceleration sensor 120 and calculates (estimates) a distance based on the number of steps. When the activity state transitions to the first state, the display update is stopped and the display of the distance is maintained. In the fourth second state, for example, the display returns to the display of the lap pace.

According to the embodiment, whenever the activity state transitions to the second state (for example, whenever the electrophoretic panel 140 is seen), the display content is changed. Therefore, the user can switch the display content only by performing a given operation (for example, sight) without performing a button operation, for example, while the user is running. Since the display update is stopped in the first state, it is possible to reduce the progress of the deterioration in the electrophoretic panel 140 (the difference in the degree of progress of the deterioration in a screen).

In the embodiment, the wearable device 100 includes the light source 180 that illuminates the electrophoretic panel 140. The processing circuit 110 may turn off the light source 180 when the activity state is determined to be the first state.

Figure 12:
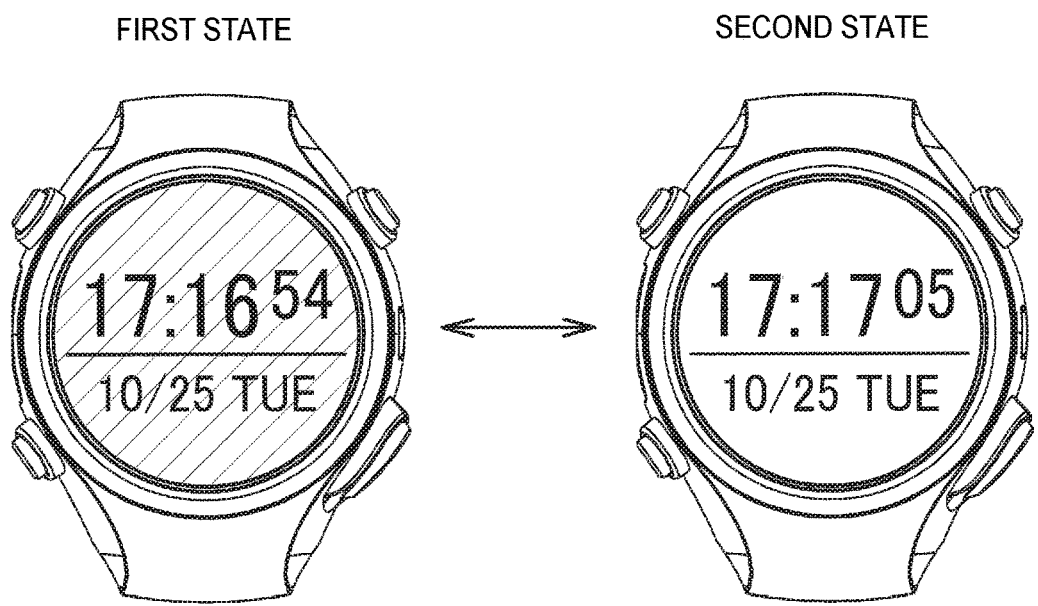
FIG. 12 is a diagram illustrating a sixth example of the display process according to the embodiment.

FIG. 12 is a diagram illustrating a sixth example of the display process according to the embodiment. In the first state, the light source 180 is turned off and the display surface of the electrophoretic panel 140 is not illuminated. In FIG. 12, a state in which the display surface is not illuminated is indicated by hatching. In the second state, the light source 180 is turned on and the display surface of the electrophoretic panel 140 is illuminated. For example, a light guider is installed at the outer edge (for example, below the bezel 62 in FIG. 2) of the display surface of the electrophoretic panel 140 and the display surface is irradiated with light from the light source 180 by the light guider.

According to the embodiment, since the light source 180 is turned on in the second state and the light source 180 is turned off in the first state, it is possible to reduce power consumption in the illumination. When a predetermined time has elapsed after the transition from the first state to the second state, the light source 180 may be turned off. In this way, it is possible to further achieve lower power consumption.

In the embodiment, the second state is a state in which an activity amount of the user is different from in the first state. The processing circuit 110 may cause the electrophoretic panel 140 to display the first display content when the activity state is determined to be the first state. The processing circuit 110 may cause the electrophoretic panel 140 to display the second display content different from the first display content when the activity state is determined to be the second state.

The state in which the activity amount of the user is different is, for example, a state in which an exercise intensity is different as in the daily life state and the exercise state described in FIGS. 5 and 6. The invention is not limited to the daily life state and the exercise state. For example, a sleeping state and a daily life state (awakening state) may be used. As will be described in detail below, for example, the first and second states in which the activity amount of the user is different can be determined based on a detection result of the acceleration sensor 120.

For example, the second state is a state in which the activity amount is greater than in the first state. In this case, display content preferably suggested to the user when the activity amount is small in the first state is displayed by the electrophoretic panel 140. Display content preferably suggested to the user when the activity amount is large in the second state is displayed by the electrophoretic panel 140. For example, when the first state is a daily life state, for example, a timepiece and a calendar are displayed. When the second state is an exercise state, a time measurement screen (a lap pace, a split time, or the like) is displayed.

According to the embodiment, appropriate display content can be displayed according to the activity amount of the user. Thus, convenience for the user is improved. Since the position of a display region subjected to the display update is changed by changing the display content, a reduction in the progress of the deterioration in the electrophoretic panel 140 (the difference in the degree of progress of the deterioration in a screen) can be expected.

In the embodiment, the second state is a state in which the user is determined to see the electrophoretic panel 140. The activity state includes third and fourth states in which the activity amount of the user is different. When the activity state is determined to be the third state, the processing circuit 110 may detect the sight state (the second state) through a first determination process. When the activity state is determined to be the fourth state, the processing circuit 110 may detect the sight state (the second state) through a second determination process different from the first determination process.

For example, the third state is the daily life state of FIG. 5 and the fourth state is the exercise state of FIG. 6. In this case, a scheme for sight determination (determination of whether the user sees the electrophoretic panel 140) is set to be different between the daily life state and the exercise state. For example, in the daily life state, the sight determination is performed based on a direction of the acceleration of gravity detected by the acceleration sensor 120. When the direction of the acceleration of gravity is within a predetermined angle range (the wearable device 100 is within a given orientation range), the activity state is determined to be the sight state (the second state). On the other hand, in the exercise state, the sight is determined based on swing of an arm (a motion of the user) detected by the acceleration sensor 120. When the swing of the arm is not detected, the activity state is determined to be the sight state.

According to the embodiment, whether the activity state is the second state in which the user sees the electrophoretic panel 140 can be determined according to an appropriate determination scheme suitable for the activity amount of the user. Thus, it is possible to accurately determine whether the activity state is the second state in which the user sees the electrophoretic panel 140, and it is possible to reduce a possibility of information not being suggested to the user at the time of the sight. Since it is possible to reduce a possibility of the display update of the electrophoretic panel 140 not being stopped at the time of non-sight, it is possible to reduce the progress of the deterioration in the electrophoretic panel 140 (the difference in the degree of progress of the deterioration in a screen).

The configuration and the operation of the wearable device 100 according to the embodiment have been described above, but the scheme can also be performed as a method of controlling the wearable device 100. That is, the scheme may also be a control method of controlling the wearable device 100 including the electrophoretic panel 140 and a method in which the second display process different from the first display process performed in the first state is performed when the activity state of the user is determined to transition from the first state to the second state different from the first state. For example, each step is performed by the wearable device 100 or the processing circuit 110.

3. Schemes of Determining Activity State

Hereinafter, schemes of determining (detecting) a daily life state and an exercise state will be described. Any of the schemes to be described below may be used and a plurality of schemes may be combined to be used.

A first scheme is a threshold scheme of determining magnitude of acceleration detected by the acceleration sensor 120. That is, the activity state is determined to be the exercise state (the second state) when the magnitude of acceleration is greater than a first threshold. The activity state is determined to be the daily life state (the first state) when the magnitude of the acceleration is less than a second threshold less than the first threshold.

A second scheme is a determination scheme based on a histogram of acceleration detected by the acceleration sensor 120. The histogram may be, for example, a histogram of the magnitude of the acceleration or may be a histogram of the magnitude and direction of the acceleration. For example, according to a peak of the histogram (acceleration at which the number samples of the histogram is the maximum) or a shape of the histogram, it is determined whether a determination condition of the daily life state is satisfied or a determination condition of the exercise state is satisfied.

A third scheme is a determination scheme based on frequency characteristics of acceleration detected by the acceleration sensor 120. Here, an exercise state in which a periodic motion such as running or walking is involved will be described as an example but the invention is not limited thereto. This scheme can be applied when frequency characteristics of acceleration differs between the daily life state and the exercise state.

Figure 13:
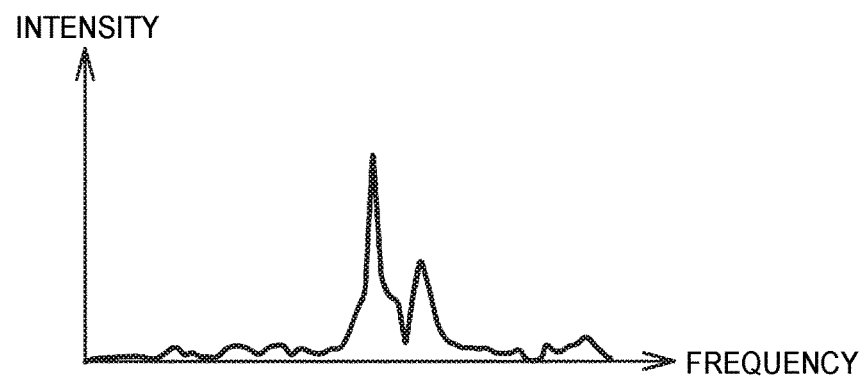
FIG. 13 is a diagram illustrating frequency characteristics of acceleration detected in an exercise state (second state).
Figure 14:
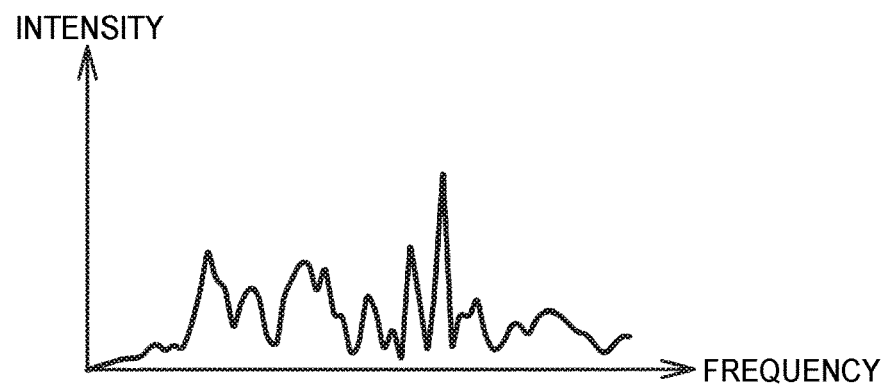
FIG. 14 is a diagram illustrating frequency characteristics of acceleration detected in a daily life state (first state).

FIG. 13 is a diagram illustrating frequency characteristics of acceleration detected in the exercise state (the second state). FIG. 14 is a diagram illustrating frequency characteristics of acceleration detected in the daily life state (the first state). The frequency characteristics are obtained by performing Fourier transform on chronological acceleration detected by the acceleration sensor 120.

As illustrated in FIG. 13, since there is periodicity in acceleration because of swing of an arm at running or walking in the exercise state, there is a peak of the frequency characteristics at a frequency corresponding to the period. The intensity at this peak (the magnitude of a frequency component) is considerably greater than intensity at other frequencies. On the other hand, as illustrated in FIG. 14, since periodicity of acceleration is small in the daily life state, a difference between the intensity at the maximum peak of the frequency characteristics and the intensity at the other frequencies is less than in the exercise state. By determining such a difference, it is possible to distinguish the daily life state from the exercise state. For example, when a difference between a maximum peak and another peak exceeds a threshold, the activity state may be determined to be the exercise state. Alternatively, when there is a peak exceeding the threshold, the activity state may be determined to be the exercise state.

A fourth scheme is a scheme of determining that a state finally transitions when a given number of determinations is satisfied. That is, in the daily life state, the activity state is determined to finally transition to the exercise state when the activity state is determined to be the exercise state N times. In the exercise state, the activity state is determined to finally transition to the daily life state when the activity state is determined to be the daily life state M times. In the determination of each time, any of the first to third schemes may be used. N and M is an integer equal to or greater than 1. N and M may be the same number or may be different numbers.

The example of the case in which acceleration detected by the acceleration sensor 120 is used as an evaluation value of a motion has been described above, but the evaluation value of a motion is not limited thereto. For example, when a gyro sensor is adopted as a body motion sensor, acceleration may be used as an evaluation value of a motion. Alternatively, a value obtained by processing acceleration or an angular velocity may be used as an evaluation value of a motion. Alternatively, the wearable device 100 may include a pulse sensor (not illustrated) and may determine a daily life state and an exercise state based on a pulse detected by the pulse sensor.

Next, a scheme of determining (detecting) a non-sight state and a sight state will be described. An example of a case in which different determination schemes are used for an exercise state and a daily life state will be described below, but the invention is not limited thereto. The same determination scheme (for example, detection based on an orientation of the wearable device 100) may be used for an exercise state and a daily life state.

Figure 15:
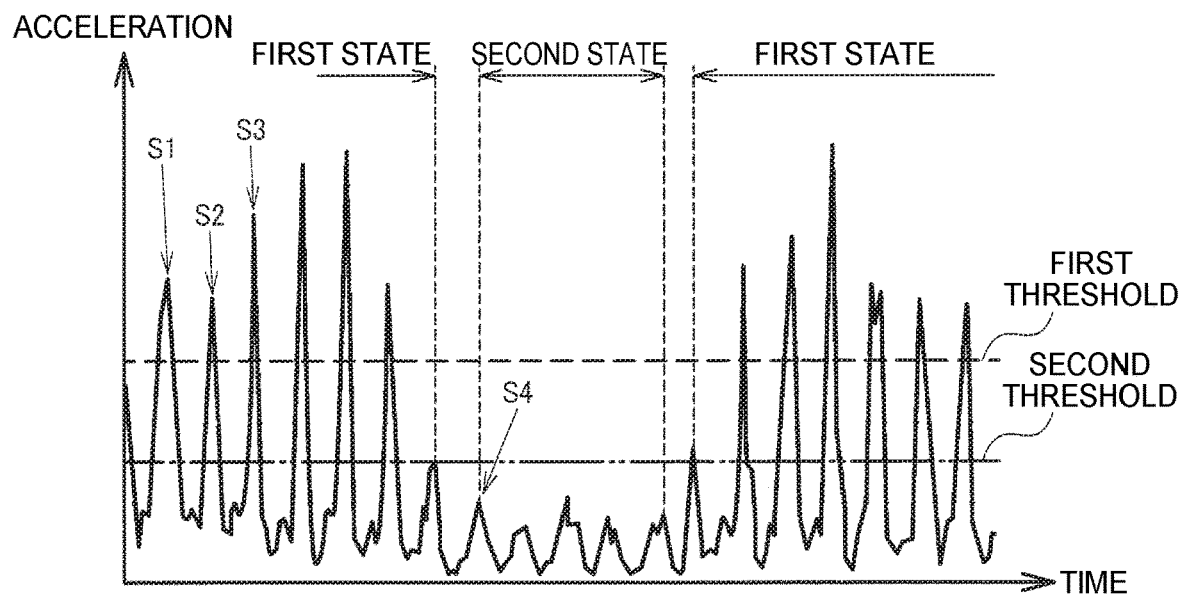
FIG. 15 is a diagram illustrating a scheme of determining a non-sight state and a sight state in an exercise state.

FIG. 15 is a diagram illustrating a scheme of determining a non-sight state and a sight state in an exercise state. In an exercise state in which running or walking is performed, as indicated by S1 to S3 of FIG. 15, periodic peaks occur in acceleration because of a motion with periodicity such as swing of an arm. In the first state (non-sight state) in which a user swings his or her arms, the peaks increase. Therefore, when acceleration (a peak of acceleration) is greater than a first threshold, the activity state is determined to be the first state (the non-sight state). Conversely, as indicated by S4, when acceleration (a peak of acceleration) is less than a second threshold, the activity state is determined to be the second state (the sight state). The second threshold is a value less than the first threshold.

In a daily life state, since periodicity of a motion is not clear as in the above case, the non-sight state and the sight state are determined based on an orientation of the wearable device 100. For example, the acceleration sensor 120 is a sensor that detects acceleration of three XYZ axes. For example, the Z axis is an axis oriented along a normal direction of the display surface of the electrophoretic panel 140 and the X and Y axes are axes that are orthogonal to the Z axis and are orthogonal to each other. Since acceleration generated by a motion is considered to be small in a daily life state, acceleration of the three axes can be considered to be acceleration vectors of the acceleration of gravity. The non-sight state and the sight state are determined based on the directions of the acceleration vectors of the acceleration of gravity (angles formed between the XYZ axes and the acceleration vectors). When the user sees the electrophoretic panel 140 in a standing state (at least the user raises up his or her upper body), the display surface of the electrophoretic panel 140 is expected to be oriented in the substantially vertical direction (the acceleration of gravity is oriented in the −Z direction). Therefore, when the acceleration of gravity is determined to be within a predetermined angle range (orientation range) centering on the −Z direction, the activity state is determined to be the sight state.

As described above, in the embodiment, the processing circuit 110 determines an activity state based on at least one of a motion and an orientation of the wearable device 100 worn by the user.

In this way, based on at least one of a motion and an orientation of the wearable device 100, it is possible to determine whether the activity state of the user transitions from the first state to the second state. Then, when the activity state is determined to transition to the second state, it is possible to reduce the progress of the deterioration in the electrophoretic panel 140 (the difference in the degree of progress of the deterioration in a screen) by performing the second display process different from the first display process performed in the first state.

In the embodiment, the processing circuit 110 determines that the activity state is a state in which the user sees the electrophoretic panel 140 based on at least one of a motion and an orientation of the wearable device 100. That is, the processing circuit 110 determines that the activity state is the second state when the processing circuit 110 determines that the user sees the electrophoretic panel 140 based on at least one of a motion and an orientation of the wearable device 100.

That is, at least one of a motion and an orientation satisfies a given condition when the user sees the electrophoretic panel 140, and when it is determined that at least one of the motion and the orientation satisfies the given condition, the processing circuit 110 determines that the activity state is the second state.

In this way, it is possible to determine whether the activity state of the user transitions to the second state which is the sight state. Then, by performing the second display process in the sight state, it is possible to suggest information to the user. On the other hand, by performing the first display process in the first state which is the non-sight state, it is possible to reduce the progress of the deterioration in the electrophoretic panel 140 (the difference in the degree of progress of the deterioration in a screen).

The foregoing embodiment has been described above, but those skilled in the art can easily understand that many modifications can be made without substantially departing from the new factors and advantages of the invention. Accordingly, the modification examples are all included in the scope of the invention. For example, in the present specification and the drawings, the terms described at least once along with other broader or equivalent terms can be substituted with other terms in any point of the present specification or the drawings. All the combination of the embodiment and the modification examples are also included in the scope of the invention. The configuration and operations of the processing circuit, the wearable device, the method of controlling the wearable device, and the like are not limited to the description of the present embodiment either and various modifications can be made.

What is claimed is:

1. A wearable device comprising:
an electrophoretic panel; and
processor configured to:
   perform a first display process on the electrophoretic panel in a first activity state of a user; and
   perform a second display process different from the first display process when an activity state of the user is determined to transition from the first activity state to a second activity state different from the first activity state,
wherein the second display process is updating a display object displayed on a given display region of the electrophoretic panel, and the first display process is updating a display object displayed on a display region other than the given display region,
wherein the display object displayed on a given display region is only displayed in the second display process, the display object displayed on the display region other than the given display region is only displayed in the first display process,
wherein the display object displayed on a given display region and the display object displayed on the display region other than the given display region represent the same information,
wherein a number of display updates of the given display region in the second display process is equal to a number of display updates of the display region other than the given display region in the first display process in order to reduce a difference in degree of progress of deterioration in the electrophoretic panel, and
wherein the second activity state is a state in which an activity amount of the user is different from in the first activity state.

2. The wearable device according to claim 1, wherein the first display process is maintaining display of an image displayed on the electrophoretic panel during a transition from the second activity state to the first activity state.

3. The wearable device according to claim 1, further comprising: a driving circuit that drives the electrophoretic panel based on the display processes.

4. The wearable device according to claim 1, wherein first and second display objects are displayed on the electrophoretic panel, an update frequency of the first display object is higher than that of the second display object, the first display process is setting a display mode of the first display object to a first display mode, and the second display process is setting the display mode of the first display object to a second display mode different from the first display mode.

5. The wearable device according to claim 1, wherein the processor causes the electrophoretic panel to display first display content when the activity state is determined to be the second activity state, and the processor causes the electrophoretic panel to display second display content different from the first display content on the electrophoretic panel when the activity state is determined to transition to the first activity state and subsequently transition to the second activity state.

6. The wearable device according to claim 1, further comprising: a light source that illuminates the electrophoretic panel, wherein the processor turns off the light source when the activity state is determined to be the first activity state.

7. The wearable device according to claim 1, wherein the processor causes electrophoretic panel to display first display content when the activity state is determined to be the first activity state, and the processor causes the electrophoretic panel to display second display content different from the first display content on the electrophoretic panel when the activity state is determined to be the second activity state.

8. The wearable device according to claim 1, wherein the second activity state is a state in which the user is determined to see the electrophoretic panel.

9. The wearable device according to claim 1, wherein the processor determines the activity state based on at least one of an orientation and a motion of the wearable device worn by the user.

10. The wearable device according to claim 9, wherein based on at least one of the orientation and the motion of the wearable device, the processor determines that the activity state is a state in which the user sees the electrophoretic panel.

11. A method of controlling a wearable device including an electrophoretic panel, the method comprising:
performing a first display process on the electrophoretic panel in a first activity state of a user; and
performing a second display process different from the first display process when an activity state of the user is determined to transition from the first activity state to a second activity state different from the first activity state,
wherein the second display process is updating a display object displayed on a given display region of the electrophoretic panel, and the first display process is updating a display object displayed on a display region other than the given display region,
wherein the display object displayed on a given display region is only displayed in the second display process, the display object displayed on the display region other than the given display region is only displayed in the first display process,
wherein the display object displayed on a given display region and the display object displayed on the display region other than the given display region represent the same information,
wherein a number of display updates of the given display region in the second display process is equal to a number of display updates of the display region other than the given display region in the first display process in order to reduce a difference in degree of progress of deterioration in the electrophoretic panel, and
wherein the second activity state is a state in which an activity amount of the user is different from in the first activity state.

12. A wearable device comprising:
an electrophoretic panel; and
a processor configured to:
determine whether a user is engaged in a first activity state or a second activity state different from the first activity state;
perform a first display process on the electrophoretic panel during the first activity state; and
perform a second display process different from the first display process when an activity state of the user is determined to transition from the first activity state to the second activity state,
wherein the second display process is updating a display object displayed on a given display region of the electrophoretic panel, and the first display process is updating a display object displayed on a display region other than the given display region,
wherein the display object displayed on a given display region is only displayed in the second display process, the display object displayed on the display region other than the given display region is only displayed in the first display process,
wherein the display object displayed on a given display region and the display object displayed on the display region other than the given display region represent the same information,
wherein a number of display updates of the given display region in the second display process is equal to a number of display updates of the display region other than the given display region in the first display process in order to reduce a difference in degree of progress of deterioration in the electrophoretic panel, and
wherein the second activity state is a state in which an activity amount of the user is different from in the first activity state.

* * * * *